United States Patent
Peng et al.

(10) Patent No.: US 11,115,730 B2
(45) Date of Patent: Sep. 7, 2021

(54) VIDEO SHARING IMPLEMENTATION METHOD AND SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Ganglin Peng, Beijing (CN); Xuechao Cao, Beijing (CN); Man Zhang, Beijing (CN); Fan Li, Beijing (CN); Yuefeng Wu, Beijing (CN); Sikun Yao, Beijing (CN); Weihua Zhang, Beijing (CN); Hongguang Zhang, Beijing (CN); Leifeng Kong, Beijing (CN); Shitao Song, Beijing (CN); Jiangxu Wu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 63 days.

(21) Appl. No.: 16/098,693

(22) PCT Filed: Apr. 21, 2017

(86) PCT No.: PCT/CN2017/081392
§ 371 (c)(1),
(2) Date: Nov. 2, 2018

(87) PCT Pub. No.: WO2017/190596
PCT Pub. Date: Nov. 9, 2017

(65) Prior Publication Data
US 2019/0182562 A1    Jun. 13, 2019

(30) Foreign Application Priority Data

May 5, 2016    (CN) .......................... 201610291309.X

(51) Int. Cl.
*H04N 21/858* (2011.01)
*H04N 21/478* (2011.01)
(Continued)

(52) U.S. Cl.
CPC ....... *H04N 21/858* (2013.01); *H04N 21/2743* (2013.01); *H04N 21/478* (2013.01);
(Continued)

(58) Field of Classification Search
CPC ............. H04N 21/858; H04N 21/2743; H04N 21/478; H04N 21/47815; H04N 21/4784;
(Continued)

(56) References Cited

U.S. PATENT DOCUMENTS 7,779,058 B2    8/2010    Shea
8,615,474 B2    12/2013   Avedissian et al.
(Continued)

FOREIGN PATENT DOCUMENTS

CN    101754097 A    6/2010
CN    103188573 A    7/2013
(Continued)

OTHER PUBLICATIONS

Combined Russian Office Action and Search Report dated Sep. 17, 2019 in Russian Patent Application No. 2018142826 (with English translation of Office Action), 9 pages.
(Continued)

*Primary Examiner* — Alfonso Castro
(74) *Attorney, Agent, or Firm* — Oblon, McClelland, Maier & Neustadt, L.L.P.

(57) ABSTRACT

A video sharing implementation method and system are provided, with the method including receiving a user's
(Continued)

access request for a video sharing link which carries an address of a video and an identifier of a shared object, parsing the video sharing link to obtain the address of the video and the identifier of the shared object, playing the video according to the address of the video, and displaying the shared object corresponding to the identifier of the shared object in a video display interface, and jumping to a product link of the shared object in response to the user's selection of the shared object.

11 Claims, 8 Drawing Sheets

(51) Int. Cl.
    *H04N 21/2743*     (2011.01)
    *H04N 21/4784*     (2011.01)
    *H04N 21/4788*     (2011.01)
    *H04N 21/81*     (2011.01)
    *G06Q 50/00*     (2012.01)

(52) U.S. Cl.
    CPC ..... *H04N 21/4784* (2013.01); *H04N 21/4788* (2013.01); *H04N 21/47815* (2013.01); *H04N 21/8146* (2013.01); *H04N 21/8586* (2013.01); *G06Q 50/01* (2013.01)

(58) Field of Classification Search
    CPC ........... H04N 21/4788; H04N 21/8146; H04N 21/8586; G06Q 50/01
    USPC ......................................................... 725/32
    See application file for complete search history.

(56) References Cited

U.S. PATENT DOCUMENTS

| | | | |
|---|---|---|---|
| 2002/0056123 A1 | 5/2002 | Liwerant et al. | |
| 2005/0137958 A1 | 6/2005 | Huber et al. | |
| 2011/0188742 A1 | 8/2011 | Yu et al. | |
| 2012/0167146 A1* | 6/2012 | Incorvia | H04N 21/4725 725/60 |
| 2012/0239469 A1 | 9/2012 | Steinberg et al. | |
| 2013/0260727 A1 | 10/2013 | Knudson et al. | |
| 2015/0170245 A1 | 6/2015 | Scoglio | |
| 2015/0256858 A1 | 9/2015 | Xue | |
| 2016/0027067 A1 | 1/2016 | Zindler et al. | |
| 2016/0205431 A1* | 7/2016 | Avedissian | H04N 21/8456 725/37 |

FOREIGN PATENT DOCUMENTS

| | | |
|---|---|---|
| CN | 103297840 A | 9/2013 |
| CN | 103634623 A | 3/2014 |
| CN | 103686249 A | 3/2014 |
| CN | 103888785 A | 6/2014 |
| CN | 104065632 A | 9/2014 |
| CN | 105474248 A | 4/2016 |
| CN | 105872839 A | 8/2016 |
| RU | 2014 127 331 A | 2/2016 |
| WO | WO 2015/096648 A1 | 7/2015 |

OTHER PUBLICATIONS

Chinese Office Action dated Jan. 3, 2018 in Patent Application No. 201610291309.X, 3 pages.
Combined Chinese Office Action and Search Report dated Aug. 3, 2017 in Patent Application No. 201610291309.X (with English translation of Categories of Cited Documents), 6 pages.
International Search Report dated Jul. 20, 2017 in PCT/CN2017/081392.
Australian Office Action dated Sep. 30, 2020 in Patent Application No. 2017259530, 6 pages.
Office Action dated Apr. 29, 2021 in Australian Application No. 2017259530.
Office Action dated May 31, 2021 in Indian Application No. 201837045207.

* cited by examiner

VIDEO SHARING IMPLEMENTATION METHOD AND SYSTEM

CROSS REFERENCE

This application is based upon and claims the benefit of priority from Chinese patent application CN201610291309.X, filed on May 5, 2016, the disclosure of which is incorporated herein in its entirety by reference.

TECHNICAL FIELD

The present disclosure relates to the field of Internet technology, and in particular to a method and a system of implementing video sharing.

BACKGROUND

Social sharing means that in the Internet, based on its sharing function, information is networked to be input and output to accelerate organizational communication. Common social media forms are, for example, blogs, microblogs, social networks and content communities, etc. In recent years, with the development of Internet technology, the form of information exchange has become a form of multimedia real-time transmission. At the same time, with the development of network multimedia technology, various streaming media applications are constantly updated. Users cannot only realize social sharing in the form of texts and pictures, but also realize social sharing of videos.

At present, during display, video players only process, such as decode, a video, with field controls such as automatic display and cyclic display, etc. If combining a video with the introduction or link of related people or things is wanted, for example, implant a purchase link of product in the video so that the video viewer can purchase through the purchase link of the product, at present, one implementation method is to adopt a form of patch advertisement, that is, to place a mandatory patch advertisement in front of the video to display the product.

SUMMARY

According to some embodiments of the present disclosure, there is provided a video sharing implementation method, comprising: receiving a user's access request for a video sharing link; parsing the video sharing link to obtain an address of a video and an identifier of a shared object; playing the video according to the address of the video, and displaying the shared object corresponding to the identifier of the shared object in a video display interface; jumping to a product link of the shared object in response to the user's selection of the shared object.

In some embodiments, the video sharing link carriers an identifier of a video sharer, which is added into the product link of the shared object in response to the user's selection of the shared object.

In some embodiments, wherein the displaying the shared object corresponding to the identifier of the shared object in a video display interface comprises: obtaining at least one kind of textual and graphic information of the shared object according to the identifier of the shared object; displaying the at least one kind of textual and graphic information of the shared object in the video display interface.

In some embodiments, the method further comprises: displaying a share button in the video display interface; forwarding the video sharing link to a social network in response to the user's triggering of the share button.

In some embodiments, the video sharing link forwarded to a social network carries an identifier of the user.

In some embodiments, the video sharing link carries the address of the video and the identifier of the shared object; the video sharing link is generated by: receiving the video and the product link of the shared object; acquiring the identifier of the video sharer; acquiring the identifier of the shared object according to the product link of the shared object; generating the video sharing link according to the identifier of the video sharer, the address of the video and the identifier of the shared object.

In some embodiments, the method further comprises: rewarding the video sharer according to the identifier of the video sharer if the user buys the shared object via the product link of the shared object.

In some embodiments, the video sharing link also carries an identifier of a reward system, which is added into the product link of the shared object in response to the user's selection of the shared object; and in a case where the user buys the shared object via the product link of the shared object, the video sharer is rewarded according to the identifier of the video sharer by the reward system linked by the identifier of the reward system.

In some embodiments, the video sharer is a user who posts the video or both a user who posts the video and a user who forwards the video.

A According to some other embodiments of the present disclosure, there is provided a video sharing implementation system, comprising: a memory device; and a processor coupled to the memory device, which is configured to execute instructions stored in the memory device that cause the processor to perform operations comprising: receiving a user's access request for a video sharing link; parsing the video sharing link to obtain an address of a video and an identifier of a shared object; playing the video according to the address of the video, and displaying the shared object corresponding to the identifier of the shared object in a video display interface; jumping to a product link of the shared object in response to the user's selection of the shared object.

In some embodiments, the video sharing link carriers an identifier of a video sharer, which is added into the product link of the shared object in response to the user's selection of the shared object.

In some embodiments, the displaying the shared object corresponding to the identifier of the shared object in a video display interface comprises: obtaining at least one kind of textual and graphic information of the shared object according to the identifier of the shared object; displaying the at least one kind of textual and graphic information of the shared object in the video display interface.

In some embodiments, the instructions cause the processor to perform operations further comprising: displaying a share button in the video display interface; forwarding the video sharing link to a social network in response to the user's triggering of the share button.

In some embodiments, the video sharing link forwarded to a social network carries an identifier of the user.

In some embodiments, the video sharing link carries the address of the video and the identifier of the shared object; the video sharing link is generated by: receiving the video and the product link of the shared object; acquiring the identifier of the video sharer; acquiring the identifier of the shared object according to the product link of the shared object; generating the video sharing link according to the identifier of the video sharer, the address of the video and the identifier of the shared object.

In some embodiments, the instructions cause the processor to perform operations further comprising: rewarding the video sharer according to the identifier of the video sharer if the user buys the shared object via the product link of the shared object.

In some embodiments, the video sharing link also carries an identifier of a reward system, which is added into the product link of the shared object in response to the user's selection of the shared object; and in a case where the user buys the shared object via the product link of the shared object, the video sharer is rewarded according to the identifier of the video sharer by the reward system linked by the identifier of the reward system.

In some embodiments, the video sharer is a user who posts the video or both a user who posts the video and a user who forwards the video.

According to some other embodiments, there is provided a non-transitory readable storage medium storing a computer program, when executed by a processor, causes the processor to perform: receiving a user's access request for a video sharing link; parsing the video sharing link to obtain an address of a video and an identifier of a shared object; playing the video according to the address of the video, and displaying the shared object corresponding to the identifier of the shared object in a video display interface; jumping to a product link of the shared object in response to the user's selection of the shared object.

Further features of the present disclosure, as well as advantages thereof, will become clearer from the following detailed description of exemplary embodiments of the present disclosure with reference to the accompanying drawings.

BRIEF DESCRIPTION OF THE DRAWINGS

To explain the embodiments of the present invention or the technical solutions in the prior art more clearly, a brief introduction will be given below for the drawings required in the description of the embodiments or the prior art. Apparently, the drawings illustrated as follows are merely some of the embodiments of the present disclosure. An ordinary person skilled in the art may also acquire other drawings according to such drawings without paying any inventive effort.

DETAILED DESCRIPTION

The technical solutions in the embodiments of the present invention will be clearly and completely described below with reference to the drawings of the embodiments of the present invention. Obviously, the described embodiments are just a part, instead of all, of the embodiments of the present invention. The following description of at least one of the exemplary embodiments is actually merely illustrative, and is not meant to be limitation on the present invention and its application or use in any way. All other embodiments obtained by persons of ordinary skill in the art based on the embodiments of the present invention without paying creative efforts shall fall within the protection scope of the present disclosure.

The inventors find that the cost of the patch advertisement is high, and the user has to pause the video to see the product display, which affects the user's viewing process. Moreover, the advertising content and the video are less relevant. The mandatory characteristics of the advertisement is not acceptable to the user. On the other hand, the form of patch advertisements is not suitable for ordinary users to combine the videos with the products they want to share for social sharing.

One technical problem to be solved by the present disclosure is: to provide a novel social sharing solution for combining the videos with the products.

In the following part, some embodiments of video sharing implementation method in the present disclosure will be described with reference to FIG. 1.

Figure 1:
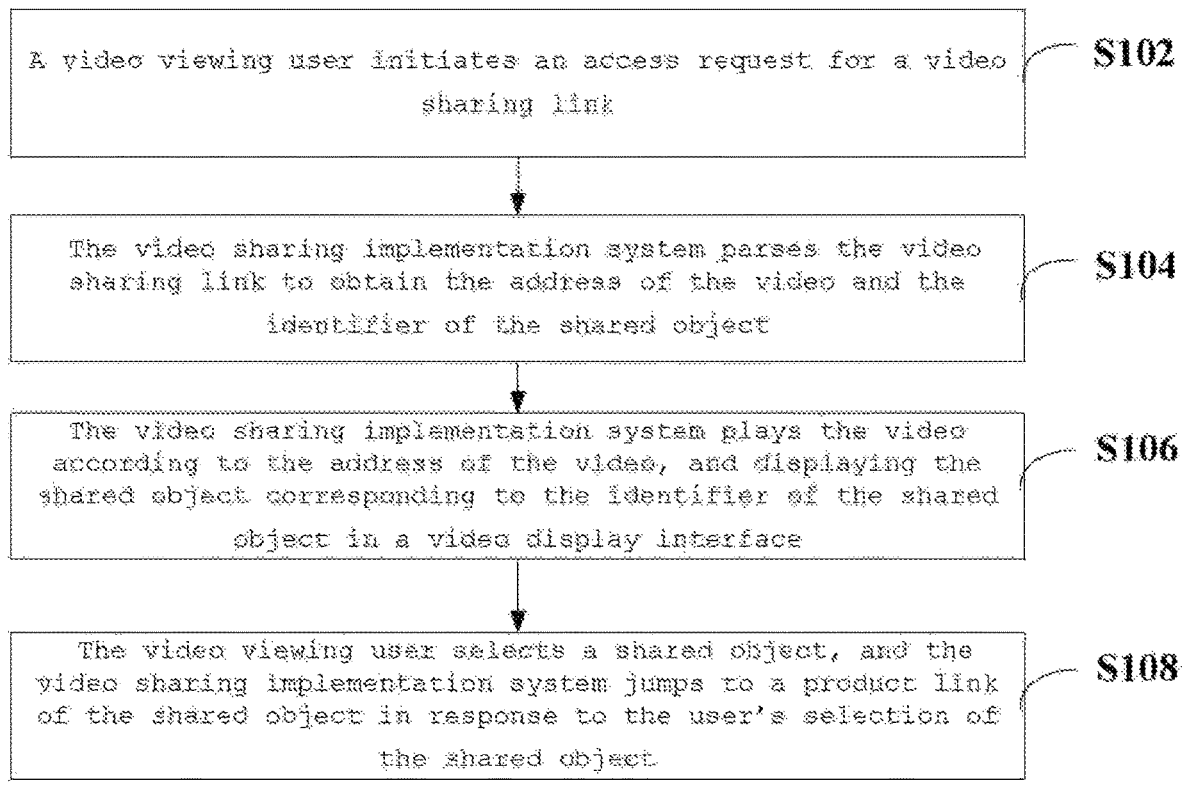
FIG. 1 is a flow diagram of a video sharing implementation method in some embodiments of the present disclosure.

FIG. 1 is a flow diagram of a video sharing implementation method in some embodiments of the present disclosure. As shown in FIG. 1, the method of the embodiments includes: steps S102~S108.

At step S102, a video viewing user initiates an access request for a video sharing link, and correspondingly, a video sharing implementation system receives the access request for the video sharing link from the video viewing user. For example, The video viewing user initiates an access request for a video sharing link by clicking the video sharing link.

The video sharing link carries such information as an address of a video and an identifier of a shared object, etc. The shared object, for example, is a product intended to be shared by the video posting user. The video is, for example, a video of use or a video of recommendation of the product, but is not limited to the illustrated examples. The identifier of the shared object is, for example, a SKU (Stock Keeping Unit) of the product, which has now been referred to as an abbreviation of the product uniform number for uniquely identifying the product. SKUs of different colors of one merchandise are different. For example, if color of a piece of clothing differs in red, white, blue, SKU of the piece of clothing differs either. The identifier of the shared object may also be a code capable of uniquely identifying the product, but is not limited to the enumerated example.

At step S104, the video sharing implementation system parses the video sharing link to obtain the address of the video and the identifier of the shared object.

In some embodiments, a front-end browser of the video sharing implementation system parses the video sharing link to obtain an IP address of a background server of the video sharing implementation system, and requests for a video resource to the background server according from the video address in the video sharing link. The front-end browser also sends the identifier of the shared object to the background server to obtain information of the corresponding shared object.

At step S106, the video sharing implementation system plays the video according to the address of the video, and displaying the shared object corresponding to the identifier of the shared object in a video display interface.

In some embodiments, a front-end browser of the video sharing implementation system decodes the video resource obtained from the background server, and displays the video resource in the video display interface. The video display may be realized by, for example, HTML5 technology. For example, the front-end browser sends the identifier of the shared object to the background server to obtain, for example, a main image or graphic information of the shared object, and displays the shared object in the video display interface. For example, a window can be added to the video play window by JS (Java Script) technology to display the shared object. For example, the window can be added to the upper layer of the video play window. When there are multiple shared objects, the shared objects may be looped in a mode such as a slide show, or a shared object may be displayed when the product related to the shared object is played in the video.

At step S108, the video viewing user selects a shared object, and the video sharing implementation system jumps to a product link of the shared object in response to the user's selection of the shared object.

In some embodiments, the video viewing user clicks a shared object displayed in the video display interface, result in that the video display interface jumps to the product link of the shared object. Through an interface between the video sharing implementation system and the product purchase system of the shared object and by using the video viewing user's login information obtained by the video sharing implementation system, such as PIN ID (Personal Identification Number), via local cookie, one can log on directly to the product purchase system of the shared object.

In the method of the above embodiment, the shared object can be displayed in the video display interface during video display through the identifier of the shared object carried in the video sharing link. Thus, The video viewer can see the product display without pause. In case that a video viewer select the shared object in the display interface when watching the video, a page skip to the product link of the shared object is achieved. Thereby, the above embodiment realizes a novel social sharing of product objects through video sharing, and improves the sharing effect and user experience.

The present disclosure also provides a method of generating a video sharing link, which will be described below with reference to FIG. 2.

Figure 2:
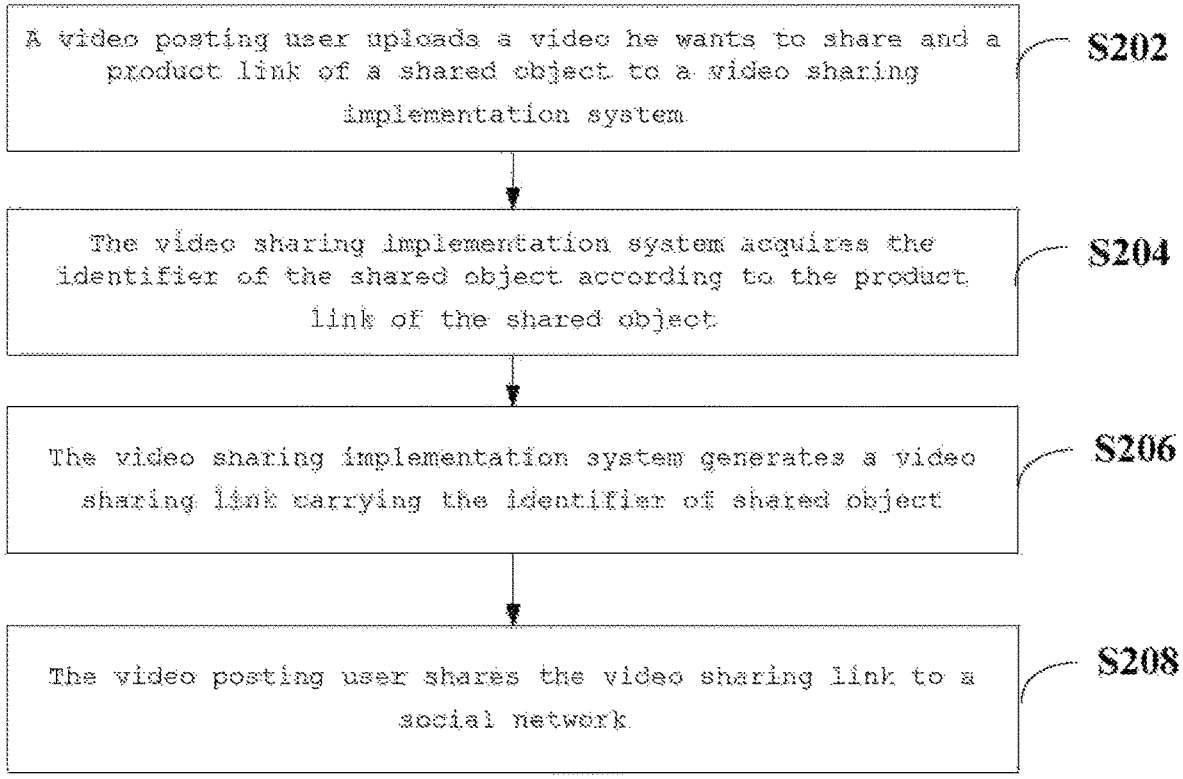
FIG. 2 is a flow diagram of a video sharing implementation method in some other embodiments of the present disclosure.

FIG. 2 is a flow diagram of a method of generating a video sharing link in some embodiments of the present disclosure. As shown in FIG. 2, the method of the embodiment includes: steps S202~S208.

At step S202, a video posting user uploads a video he wants to share and a product link of a shared object to a video sharing implementation system.

At step S204, the video sharing implementation system acquires the identifier of the shared object according to the product link of the shared object.

For example, through an interface between the video sharing implementation system and the product purchase system, the video sharing implementation system may send a request for acquiring the identifier of shared object to the product purchase system according to the product link of the shared object.

At step S206, the video sharing implementation system generates a video sharing link carrying the identifier of shared object.

In some embodiments, a video address URL (Uniform Resource Locator) is generated for the video to be shared by the user who posts the video. The identifier of the shared object is concatenated after the video address URL by using the front end technology such as HTML (Hyper Text Markup Language) and JS (JavaScript), etc., and then a video sharing link is generated. Thereby, parameter transmission of the identifier of the shared object can be realized through the video sharing link. There may be one or more identifiers of the shared object. When a plurality of identifiers of the shared object, such as SKUs, are carried in a video sharing link, they can be identified as, for example, SKU1, SKU2 . . . etc., and added after the video address URL by using, such as '&', to perform string concatenation thereon.

At step S208, the video posting user shares the video sharing link to a social network.

The video posting user shares the video sharing link to a social network by, for example, pasting the video sharing link to the social network or clicking a share button provided in the video sharing implementation system.

The method of the above embodiments realizes the generation of a video sharing link according to the video to be shared and the shared object uploaded by the video posting user. By carrying the identifier of the shared object in the video sharing link, the shared object can be acquired via the identifier of the shared object and displayed in a video display interface when the video is played.

Figure 3:
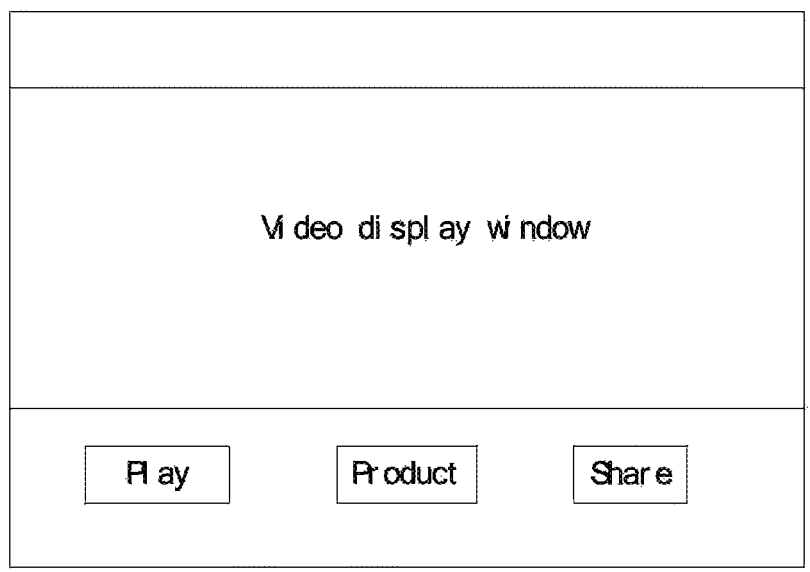
FIG. 3 is a schematic diagram of a video playback interface in some embodiments of the present disclosure.

The following is an application example of video sharing with reference to FIG. 3: a video posting user, User 1, uploads a video showing the method of playing a toy shoot by himself to a video sharing implementation system, and also uploads a purchase link of the toy. The video sharing implementation system obtains a SKU of the toy via the purchase link of the toy and generates a video sharing link carrying the SKU of the toy. The User1 posts the video sharing link to a cycle of friends. A User 2 sees the video sharing link shared by User 1, and clicks the video sharing link to enter the video display interface as shown in FIG. 3. User 2 clicks the play button to play the video, and the video player displays the graphic information of the toy in the product window, such as the main picture and the name of the toy obtained according to the toy SKU. If User 2 is interested in the toy by watching the video, he can click the graphic information of the toy displayed in the product window to enter the purchase page of the toy to purchase. A share button may also be added in the video display interface, and if User 2 wants more people to see the video or the toy, he can click the share button to share the video link to his own circle of friends.

The present disclosure also provides a video sharing implementation method combining video sharing with user rewarding, which is described below with reference to FIG. 4.

Figure 4:
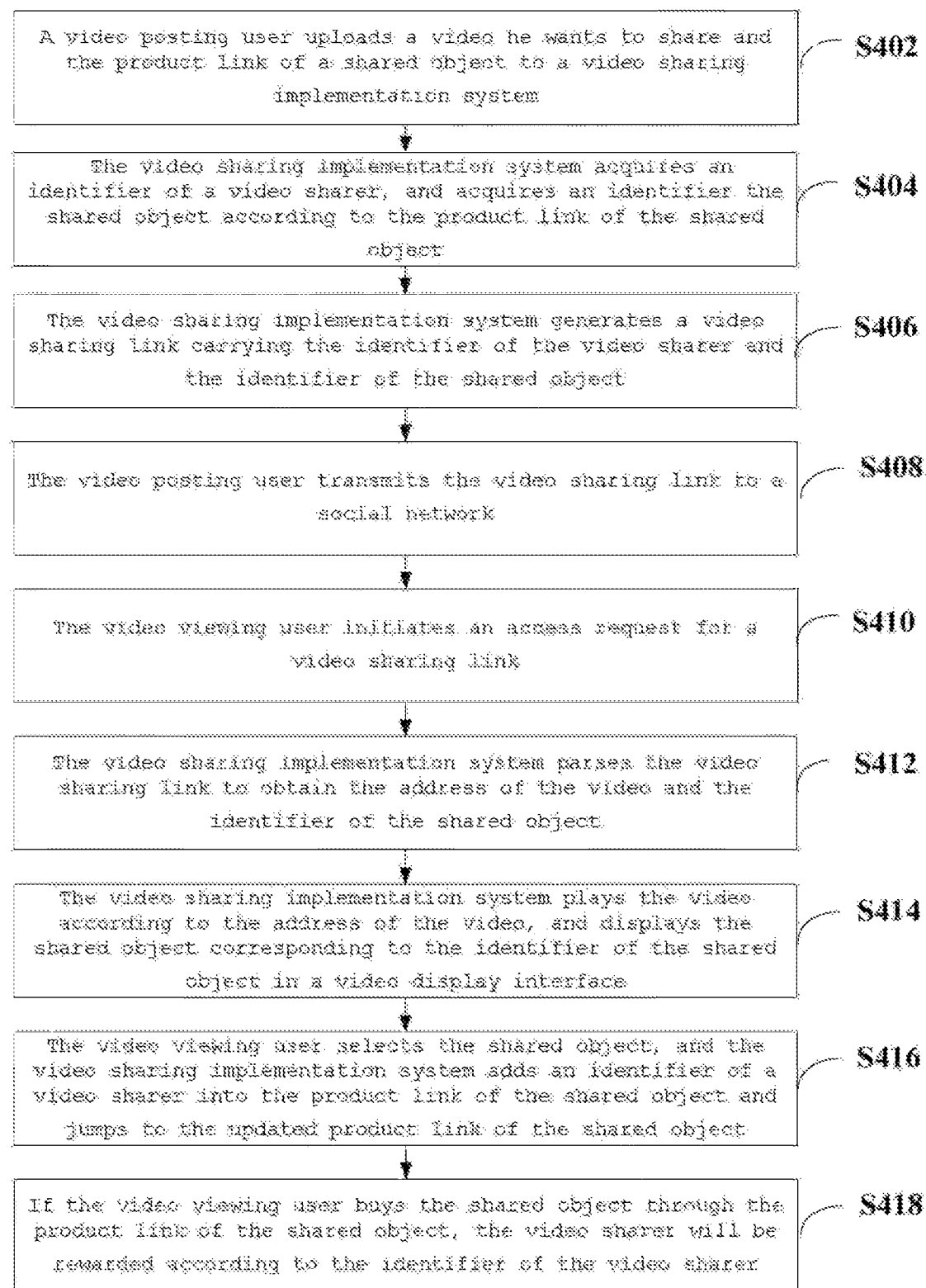
FIG. 4 is a flow diagram of a video sharing implementation method in some other embodiments of the present disclosure.

FIG. 4 is a flow diagram of a video sharing implementation method in some other embodiments of the present disclosure. As shown in FIG. 4, the method of the embodiment includes: steps S402~S418.

At step S402, a video posting user uploads a video he wants to share and the product link of a shared object to a video sharing implementation system.

At step S404, the video sharing implementation system acquires an identifier of a video sharer, and acquires an identifier the shared object according to the product link of the shared object.

The identifier of a video sharer is an identifier of the video posting user. For example, login information of the video posting user, such as PIN ID (Personal Identification Number) is obtained from local cookie as the identifier of the video posting user. The identifier of the shared object is, for example, SKU of the product. If the reward system (for example, the rebate system) is not the same system as the video sharing implementation system or the product purchase system of the shared object, the identification information of the reward system such as an identifier of a rebate system is needed for entering the reward system in the subsequent reward (e.g., rebate) process to reward (such as rebate) the user.

At step S406, the video sharing implementation system generates a video sharing link carrying the identifier of the video sharer and the identifier of the shared object.

If the identifier of the reward system is obtained, it is necessary to add the identifier of the reward system into the video sharing link, such as by using, such as '&', to perform string concatenation on. The video sharing implementation system adds the identifier of the video sharer, the identifier of the shared object and the identifier of the reward system to the video address URL. To ensure safety of the information carried in the video sharing link, the information carried in the video sharing link can be encrypted.

At step S408, the video posting user transmits the video sharing link to a social network.

At step S410, the video viewing user initiates an access request for a video sharing link.

At step S412, the video sharing implementation system parses the video sharing link to obtain the address of the video and the identifier of the shared object.

At step S414, the video sharing implementation system plays the video according to the address of the video, and displays the shared object corresponding to the identifier of the shared object in a video display interface.

At step S416, the video viewing user selects the shared object, and the video sharing implementation system adds an identifier of a video sharer into the product link of the shared object and jumps to the updated product link of the shared object.

The identifier of the video sharer is the identifier of the video posting user. If an identifier of a reward system is carried in the video sharing link, the identifier of the reward system will also be added in the product link of the shared object.

At step S418, if the video viewing user buys the shared object through the product link of the shared object, the video sharer will be rewarded according to the identifier of the video sharer.

In some embodiments, in the process that the video viewing user buys the shared object, every time the page jumps, the identifier of the video sharer and the identifier of the reward system are added into the page link of the next jump. In case that the video viewing user selects a shared object displayed in the video and enters the product link of the shared object to complete purchasing, the product purchase system will mark the order completed in this way, and the background server will obtain information of the order with the mark. In a case where an identifier of a reward system is carried in the product link of the shared object, the reward system (such as the rebate system) will be linked to according to the corresponding identifier of the reward system. The reward system will reward the video sharing user according to the identifier of video sharer and a certain rebate rule.

The method of the above embodiments realizes a social sharing of a product object by video sharing. The link of the shared object is added into the video for social sharing, and the video viewing user can see the product display without pausing the video. The video display page jumps to the product page via the product display. Moreover, the user rebating mechanism and the video sharing mechanism are combined, such that after other users buy the product via the product link in the video display interface, the video sharer will be rebated. Thus the effect of sharing and user experience as well as the user's interest in video sharing are improved.

The video viewing user may forward the video. Except rebating the video posting user, the present disclosure also provides a method of rebating the video forwarding user, which will be described below with reference to FIG. 5.

Figure 5:
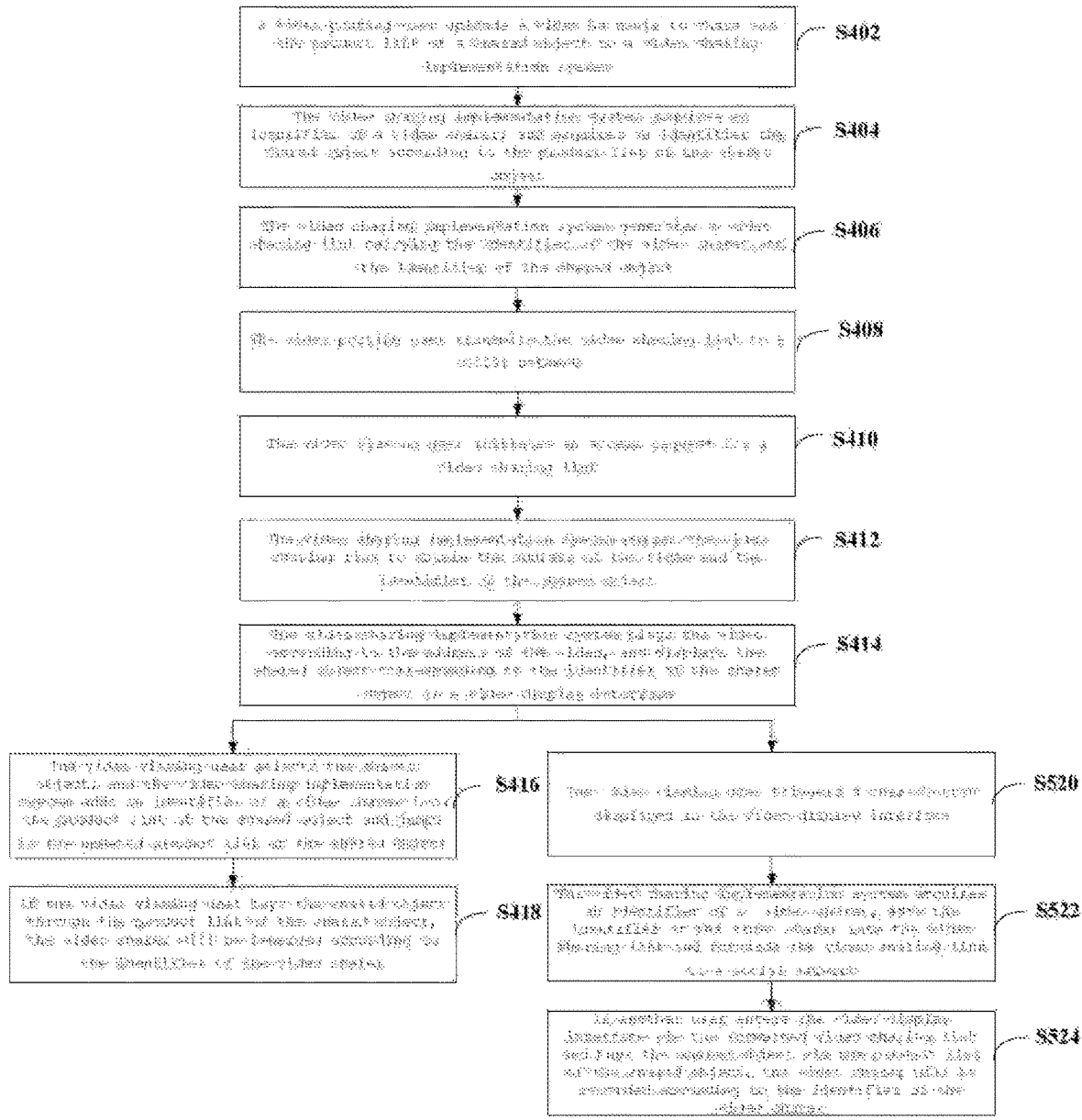
FIG. 5 is a flow diagram of a video sharing implementation method in some further embodiments of the present disclosure.

FIG. 5 is a flow diagram of a video sharing implementation method in some other embodiments of the present disclosure. As shown in FIG. 5, the video sharing implementation method which combines video sharing with user rebating also comprises: steps S520~S524.

At step S520, the video viewing user triggers a share button displayed in the video display interface.

At step S522, the video sharing implementation system acquires an identifier of a video sharer, adds the identifier of the video sharer into the video sharing link and forwards the video sharing link to a social network.

The identifier of the video sharer is the identifier of the video forwarding user, that is, the identifier of the video viewing user who forwards the video. The method of adding the identifier of the video forwarding user into the video sharing link is the same as the method of adding other identifiers, and will not be explained further here.

At step S524, if another user enters the video display interface via the forwarded video sharing link and buys the shared object via the product link of the shared object, the video sharer will be rewarded according to the identifier of the video sharer.

The video sharer includes a video posting user (posts the video) and a video forwarding user (a user who forwards the video). As for the process of rewarding the user, please refer to the embodiment corresponding to FIG. 4 as mentioned above, and further explanation is omitted.

The method in the above embodiments combines the user rebating mechanism with the video sharing mechanism, such that after other users buy the product via the link in the video display interface, the video posting user and the video forwarding user will both be rebated. Thus, the effect of sharing and user experience as well as the user's interest in video sharing are improved.

The following is an application example of implementing video sharing and rebating the video sharing user. A video posting user, User 1, uploads a video showing the method of playing a toy shoot by himself to a video sharing implementation system, and also uploads a purchase link of the toy. The video sharing implementation system obtains an identifier of User 1 and an identifier of a reward system, and obtains a SKU of the toy via the purchase link of the toy and generates a video sharing link carrying the identifier of User 1, the identifier of the reward system and the SKU of the toy. User1 posts the video sharing link to a circle of friends. A User 2 sees the video shared by User1, and clicks the video sharing link to enter the video display interface as shown in FIG. 3. User 2 clicks the play button to play the video, and displays the graphic information of the toy in the product window, such as the main picture and the name of the toy, obtained according to the toy SKU. User 2 is interested in the toy by watching the video and clicks the graphic information of the toy displayed in the product window to enter the purchase page of the toy to purchase. The purchase link of the toy also carries information of the identifier of User 1 and the identifier of the reward system, etc. User2 completes the purchase of the toy to generate an order. The product purchase system obtains the order, and links to the corresponding rebate system via the identifier of the reward system carried in the completion page link, and transmits the identifier of User 1 to the rebate system which rebates User 1 according to a certain rebate rule.

If User 2 wants more people to see the video or toy, he will click the share button, then the video sharing implementation system will add the identifier of User 2 into the video sharing link and share the updated video link to the friend cycle of User 2. If User 3 watches the video and buys the toy via the video sharing link forwarded by User 2 to generate an order. The product purchase system obtains the order, and links to the corresponding rebate system via the identifier of the reward system carried in the completion page link, and transmits the identifiers of User 1 and User 2 to the rebate system which will rebate User 1 and User 2 according to a certain rebate rule. Further, the video posting user and each user who forwards the video sharing link will be rebated.

The present disclosure also provides a video sharing implementation system, which will be described below with reference to FIG. 6.

Figure 6:
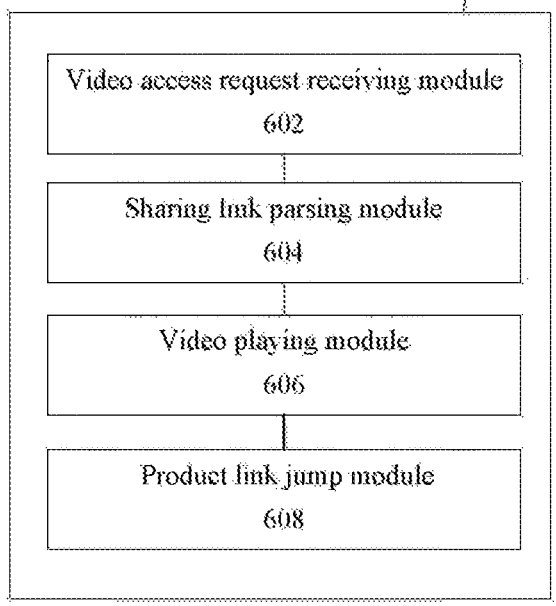
FIG. 6 is a structural diagram of a video sharing implementation system in some embodiments of the present disclosure.

FIG. 6 is a structural diagram of a video sharing implementation system in some other embodiments of the present disclosure. As shown in FIG. 6, the system 60 includes: a video access request receiving module 602, a sharing link parsing module 604, a video playing module 606, a product link jump module 608.

a video access request receiving module 602 for receiving a user access request for a video sharing link which carries a video address and a shared object identifier.

The video access request receiving module 602 is used for receiving a user's access request for a video sharing link which carries an address of a video and an identifier of a shared object.

The sharing link parsing module 604 is used for parsing the video sharing link to obtain the address of the video and the identifier of the shared object.

The video playing module 606 is used for playing the video according to the address of the video, and displaying the shared object corresponding to the identifier of the shared object in a video display interface.

In some embodiments, the video playing module 606 is used for obtaining graphic information of the shared object according to the identifier of the shared object, and displaying the graphic information of the shared object in the video display interface.

The product link jump module 608 is used for jumping to a product link of the shared object in response to the user's selection of the shared object.

The system video playing module in the above embodiment, by carrying the identifier of the shared object in the video sharing link, may display the shared object in the video display interface during video display. Thus, The video viewing user can see the product display without pause. The video viewing user may select a shared object in the display interface when viewing the video and a page skip to the product link of the shared object is achieved via the product link jump module. Thereby, the system realizes a novel social sharing of product objects through video sharing, and improves the sharing effect and user experience.

In the following part, some other embodiments of the video sharing system will be described with reference to FIG. 7.

Figure 7:
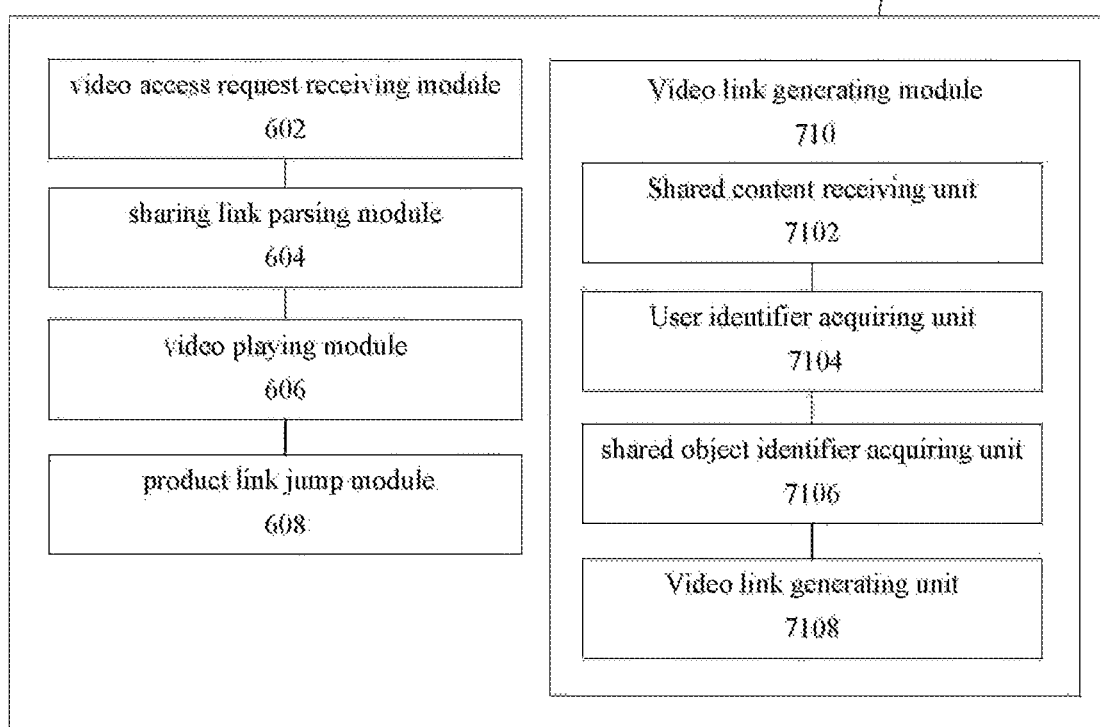
FIG. 7 is a structural diagram of a video sharing implementation system in some other embodiments of the present disclosure.

As shown in FIG. 7, the video sharing implementation system 60 also includes a video link generating module 710 which comprises: A shared content receiving unit 7102, a user identifier acquiring unit 7104, a shared object identifier acquiring unit 7106, a video link generating unit 7108.

The shared content receiving unit 7102 is used for receiving a video and a product link of a shared object.

The user identifier acquiring unit 7104 is used for acquiring an identifier of a video sharer.

The shared object identifier acquiring unit 7106 is used for acquiring an identifier of the shared object according to the product link of the shared object.

The video link generating unit 7108 is used for generating the video sharing link according to the identifier of the video sharer and the identifier of the shared object.

The above implemented system achieves generation of a video sharing link according to the video uploaded by the user and the product link of a shared object. The video sharer can add a link of the shared object in the video to realize social sharing, which improves the effect of sharing and user experience.

The present disclosure also provides a video sharing implementation system combining video sharing with user rebating.

In some embodiments, the video link generating module 710 generates a video sharing link which carries an identifier of a video sharer and an identifier of a shared object. The product link jump module 608 is used for adding the identifier of the video sharer into the product link of the shared object in response to the user's selection of the shared object and jump to the updated product link of the shared object. The product link of the shared object carries the identifier of the video sharer, and when a user buys the shared object via the product link of the shared object, the video sharer identified by the identifier of the video sharer will be rewarded. The process of identifying the video sharer according to the identifier of the video sharer and rewarding the video sharer may be performed in the product purchase system of the shared object.

In some embodiments, the video link generating module 710 generates a video sharing link which carries an identifier of a video sharer, an identifier of a shared object and an identifier of a reward system. The product link jump module 608 is used for adding the identifier of the video sharer and the identifier of the reward system into the product link of the shared object in response to the user's selection of a shared object and jump to the updated product link of the shared object. The product link of the shared object carries the identifier of the video sharer and the identifier of the reward system, and when a user buys the shared object via the product link of the shared object, the video sharer will be rewarded by the corresponding reward system linked by the identifier of the reward system according to the identifier of the video sharer.

In some embodiments, the video sharer is a user who posts the video or both a user who posts the video and a user who forwards the video.

In the following part, some other embodiments of the video sharing implementation system according to the present disclosure will be described with reference to FIG. 8.

Figure 8:
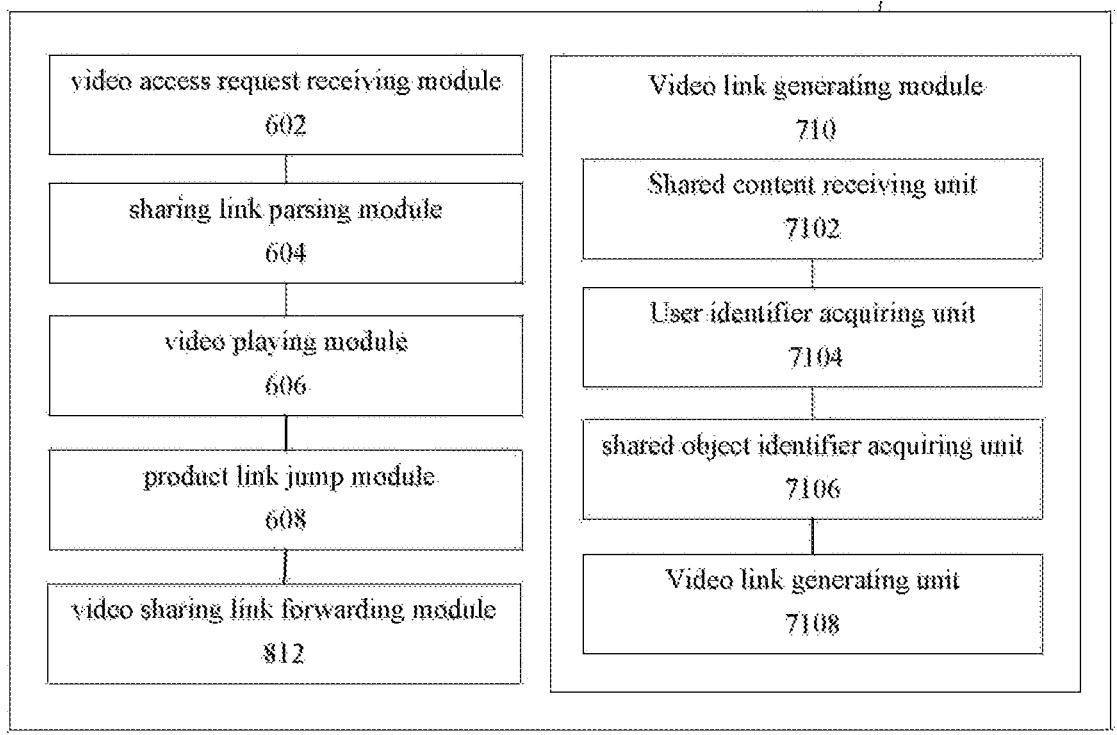
FIG. 8 is a structural diagram of a video sharing implementation system in still other embodiments of the present disclosure.

As shown in FIG. 8, the video playing module 606 is also used for displaying a share button in the video display interface. The system 60 further comprises: a video sharing link forwarding module 812 for forwarding the video sharing link to a social network in response to the user's triggering of the share button. In particular, the video sharing link forwarding module 812 is used for adding the user's identifier into the video sharing link, and forwarding the updated video sharing link to a social network.

In the above embodiments, the video link generating module adds at least one of the identifier of the video sharer and the identifier of the reward system into the video sharing link when generating the video sharing link, and the sharing user reward module combines the user rebating mechanism with the video sharing mechanism, and rebates the video sharing user, which improves the effect of sharing and the user's experience as well as the user's interest in video sharing.

The present disclosure also provides a video sharing implementation system, which will be described below with reference to FIG. 9.

Figure 9:
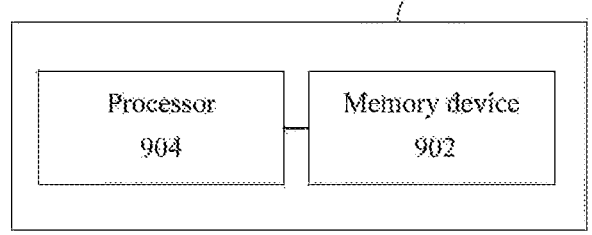
FIG. 9 is a structural diagram of a video sharing implementation system in some further embodiments of the present disclosure.

As shown in FIG. 9, the system 90 includes: a memory device 902; and a processor 904 coupled to the memory device 902, wherein the processor 904 is configured to execute a video sharing implementation method in any of the embodiments as mentioned above on a basis of the instructions stored in the memory device 902.

The video sharing implementation system in the embodiments of the present disclosure may be respectively implemented by a computer system 100, which will be described below with reference to FIG. 10.

Figure 10:
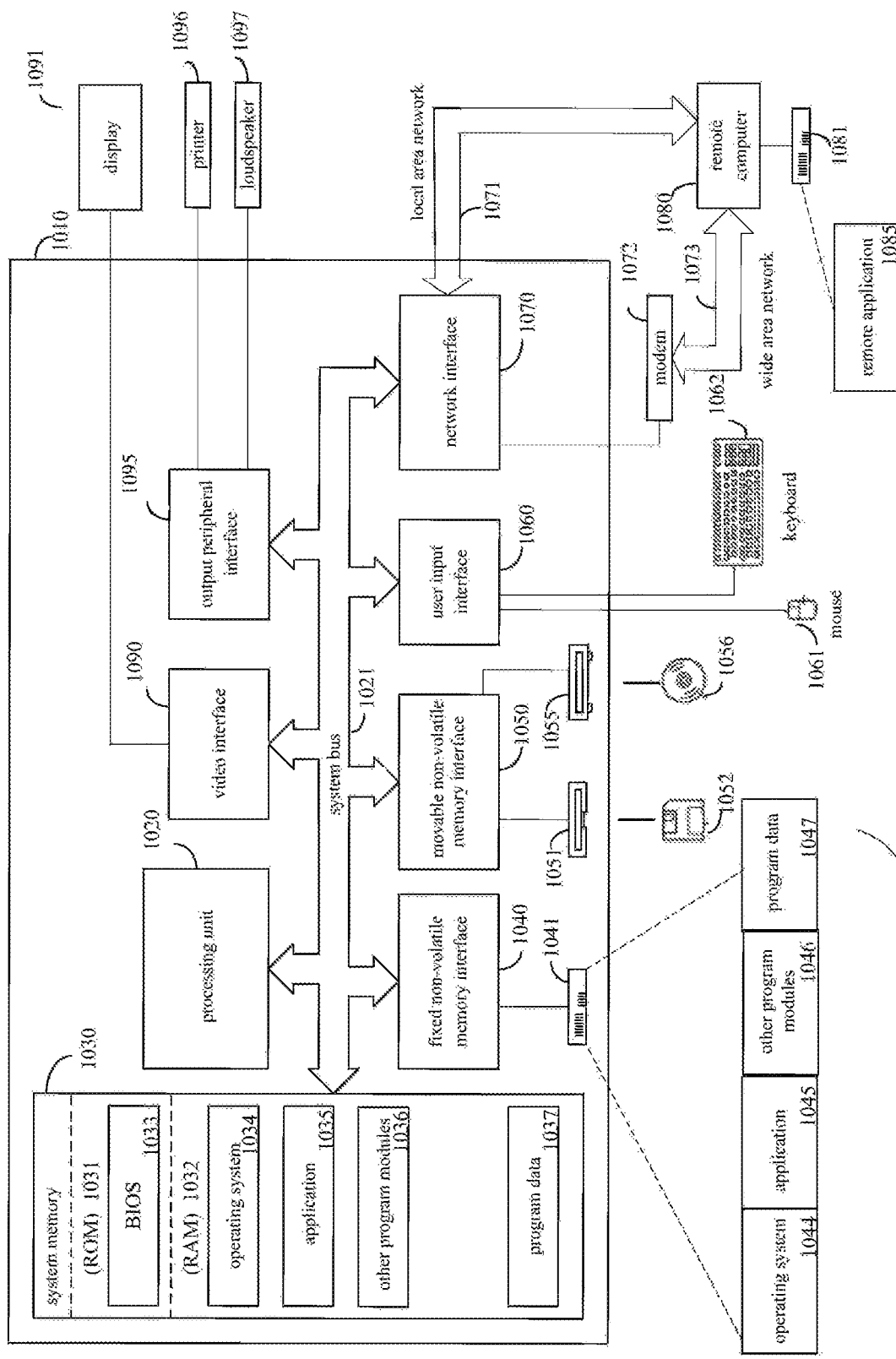
FIG. 10 is a block diagram of a schematic hardware configuration of the computer system capable of implementing the video sharing implementation system in the embodiments of the present disclosure.

As shown in FIG. 10, the computer system 100 includes a computer 1010. The computer 1010 includes a processing unit 1020 and a system memory 1030. The processing unit 1020 and the system memory 1030 may be connected via a system bus 1021. The computer 1010 may also include a fixed non-volatile memory interface 1040, a movable non-volatile memory interface 1050, a user input interface 1060, a network interface 1070, a video interface 1090 and an output peripheral interface 1095.

The system memory 1030 includes, for example, ROM (read-only memory) 1031 and RAM (random-access memory) 1032. The ROM 1031 stores, for example, BIOS (Basic Input/Output System) 1033. The RAM 1032 stores, for example, an operating system 1034, an application 1035, other program modules 1036, and certain program data 1037.

A fixed non-volatile memory 1041, such as a hardware, is connected to, for example, the fixed non-volatile memory interface 1040. The fixed non-volatile memory 1041 may store, for example, an operating system 1044, an application 1045, other program modules 1046, and certain program data 1047.

A movable non-volatile memory such as floppy disk drive 1051 and CD-ROM drive 1055 is, for example, connected to the movable non-volatile memory interface 1050. For instance, a floppy disk can be inserted into the floppy disk drive 1051, and a CD (Compact Disc) 1056 can be inserted into the CD-ROM drive 1055.

The computer 1010 can also include an input device, such as mouse 1061 and keyboard 1062, that is coupled to user input interface 1060.

The computer 1010 can be connected to a remote computer 1080 (e.g., a client or another server) via the network interface 1070. For example, the network interface 1070 can be connected to a remote computer 1080 via a local area network 1071. Alternatively, the network interface 1070 can be connected to a modem (modulator-demodulator) 1072, and modem 1072 is connected to the remote computer 1080 via wide area network 1073.

The remote computer 1080 may include a memory 1081, such as a hard disk, that stores a remote application 1085.

The video interface 1090 may be connected to a display 1091.

The output peripheral interface 1095 can be connected to output peripherals such as a printer 1096 and a speaker 1097.

The computer system shown in FIG. 10 is merely an illustrative example and is in no way intended to limit the disclosure, its application or use.

The computer system shown in FIG. 10 can be implemented in any embodiment. It can be taken as an independent computer or a processing system in a device, and one or more unnecessary components can be removed therefrom, and one or more extra components may also be added thereto. For example, computer 1010 may not include a printer 1096 and a speaker 1097, and the network interface 1070 may be implemented in any other manner, such as a 3G network interface, a Bluetooth interface, or a WIFI interface, etc. The processing unit may include one or more processors.

Those skilled in the art will appreciate that embodiments of the present disclosure may be provided as a method, system, or computer program product. Therefore, the embodiments of the present disclosure can take the form of an entirely hardware embodiment, an entirely software embodiment or an embodiment containing both hardware and software elements. Moreover, this disclosure can be in a form of one or more computer program products containing the computer-executable codes which can be implemented in the computer-executable non-transitory storage media (including but not limited to disk memory, CD-ROM, optical memory, etc.).

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implement the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

An ordinary person skilled in the art may appreciate that all or part of the steps of implementing the above embodiments may be completed by hardware, or may be complemented by commanding related hardware by a program, and the program may be stored in a computer readable storage medium. The storage medium mentioned above may be a read only memory, a magnetic disk or a optical disk, etc.

The above content is only preferred embodiments of this present disclosure, but cannot be used for limiting this disclosure. Any modification, equivalent replacement and improvement, etc. within the spirit and principle of this disclosure shall be contained in the scope of protection of this disclosure.

What is claimed is:

1. A video sharing implementation method, comprising:
receiving, by a video sharing implementation system, a user's access request for a video sharing link;
parsing, by the video sharing implementation system, the video sharing link to obtain an address of a video and an identifier of a shared object;
playing, by the video sharing implementation system, the video according to the address of the video, and displaying, by the video sharing implementation system, the shared object corresponding to the identifier of the shared object in a video display interface; and
jumping from the video sharing implementation system to a product link of the shared object in a product purchase system in response to the user's selection of the shared object, wherein
the video sharing link carries an identifier of a video sharer and an identifier of a reward system, which are added into the product link of the shared object by the video sharing implementation system in response to the user's selection of the shared object;
the video sharer is both a user who posts the video and a user who forwards the video;
in a case where the user buys the shared object via the product link of the shared object, every time a page jumps, the identifier of the video sharer and the identifier of the reward system are added into a page link of a next jump, the product purchase system links to the reward system according to the identifier of the reward system in the product link, and the reward system rewards the video sharer according to the identifier of video sharer and a rebate rule; and
the video sharing implementation system, the product purchase system, and the reward system are all different systems.

2. The method according to claim 1, wherein the displaying, by the video sharing implementation system, the shared object corresponding to the identifier of the shared object in a video display interface comprises:
obtaining, by the video sharing implementation system, at least one kind of textual and graphic information of the shared object according to the identifier of the shared object; and
displaying, by the video sharing implementation system, the at least one kind of textual and graphic information of the shared object in the video display interface.

3. The method according to claim 1, further comprising:
displaying, by the video sharing implementation system, a share button in the video display interface; and
forwarding, by the video sharing implementation system, the video sharing link to a social network in response to the user's triggering of the share button.

4. The method according to claim 3, wherein:
the video sharing link forwarded to a social network comprises carries an identifier of the user.

5. The method according to claim 1, wherein
the video sharing link carries the address of the video and the identifier of the shared object; and
the video sharing link is generated by:
receiving, by the video sharing implementation system, the video and the product link of the shared object;
acquiring, by the video sharing implementation system, the identifier of the video sharer;
acquiring, by the video sharing implementation system, the identifier of the shared object according to the product link of the shared object; and
generating, by the video sharing implementation system, the video sharing link according to the identifier of the video sharer, the address of the video and the identifier of the shared object.

6. A video sharing implementation system, comprising:
a memory device; and
a processor coupled to the memory device, which is configured to execute instructions stored in the memory device that cause the processor to perform operations comprising:
receiving, by a video sharing implementation system, a user's access request for a video sharing link;
parsing, by the video sharing implementation system, the video sharing link to obtain an address of a video and an identifier of a shared object;
playing, by the video sharing implementation system, the video according to the address of the video, and displaying, by the video sharing implementation system, the shared object corresponding to the identifier of the shared object in a video display interface; and
jumping from the video sharing implementation system to a product link of the shared object in a product purchase system in response to the user's selection of the shared object, wherein
the video sharing link carries an identifier of a video sharer and an identifier of a reward system, which are added into the product link of the shared object by the video sharing implementation system in response to the user's selection of the shared object;
the video sharer is both a user who posts the video and a user who forwards the video;
in a case where the user buys the shared object via the product link of the shared object, every time a page jumps, the identifier of the video sharer and the identifier of the reward system are added into a page link of a next jump, the product purchase system links to the reward system according to the identifier of the reward system in the product link, and the reward system rewards the video sharer according to the identifier of video sharer and a rebate rule; and
the video sharing implementation system, the product purchase system, and the reward system are all different systems.

7. The system according to claim 6, wherein the displaying, by the video sharing implementation system, the shared object corresponding to the identifier of the shared object in a video display interface comprises:
- obtaining, by the video sharing implementation system, at least one kind of textual and graphic information of the shared object according to the identifier of the shared object; and
- displaying, by the video sharing implementation system, the at least one kind of textual and graphic information of the shared object in the video display interface.

8. The system according to claim 6, wherein the instructions cause the processor to perform operations further comprising:
- displaying, by the video sharing implementation system, a share button in the video display interface; and
- forwarding, by the video sharing implementation system, the video sharing link to a social network in response to the user's triggering of the share button.

9. The system according to claim 8, wherein:
the video sharing link forwarded to a social network carries an identifier of the user.

10. The system according to claim 6, wherein
the video sharing link carries the address of the video and the identifier of the shared object; and
the video sharing link is generated by:
- receiving, by the video sharing implementation system, the video and the product link of the shared object;
- acquiring, by the video sharing implementation system, the identifier of the video sharer;
- acquiring, by the video sharing implementation system, the identifier of the shared object according to the product link of the shared object;
- generating, by the video sharing implementation system, the video sharing link according to the identifier of the video sharer, the address of the video and the identifier of the shared object.

11. A non-transitory readable storage medium storing a computer program, when executed by a processor, causes the processor to perform:
- receiving, by a video sharing implementation system, a user's access request for a video sharing link;
- parsing, by the video sharing implementation system, the video sharing link to obtain an address of a video and an identifier of a shared object;
- playing, by the video sharing implementation system, the video according to the address of the video, and displaying, by the video sharing implementation system, the shared object corresponding to the identifier of the shared object in a video display interface; and
- jumping from the video sharing implementation system to a product link of the shared object in a product purchase system in response to the user's selection of the shared object, wherein
the video sharing link carries an identifier of a video sharer and an identifier of a reward system, which are added into the product link of the shared object by the video sharing implementation system in response to the user's selection of the shared object;
the video sharer is a user who posts the video or both a user who posts the video and a user who forwards the video;
in a case where the user buys the shared object via the product link of the shared object, every time a page jumps, the identifier of the video sharer and the identifier of the reward system are added into a page link of a next jump, the product purchase system links to the reward system according to the identifier of the reward system in the product link, and the reward system rewards the video sharer according to the identifier of video sharer and a rebate rule; and
the video sharing implementation system, the product purchase system, and the reward system are all different systems.

* * * * *